(12) United States Patent
Sakata

(10) Patent No.: US 6,311,061 B1
(45) Date of Patent: Oct. 30, 2001

(54) MOBILE COMMUNICATION SYSTEM DATA MULTI-CONNECTOR

(75) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,236

(22) Filed: Dec. 4, 1998

(30) Foreign Application Priority Data

Dec. 5, 1997 (JP) .................................................. 9-335556

(51) Int. Cl.[7] .................................................. H04B 1/38
(52) U.S. Cl. ........................... 455/426; 455/560; 455/445
(58) Field of Search ................................. 375/222, 260, 375/216; 370/536, 265, 468; 348/15; 455/414, 416, 423, 445, 560, 561, 425, 426, 446, 8, 422, 557

(56) References Cited

U.S. PATENT DOCUMENTS

| 4,837,800 | * | 6/1989 | Freeburg et al. | 455/557 |
| 5,479,480 | * | 12/1995 | Scott | 455/425 |
| 5,809,066 | | 9/1998 | Suomi et al. | 375/222 |
| 5,845,210 | * | 12/1998 | Moon | 455/426 |

FOREIGN PATENT DOCUMENTS

| 59-169236 | 9/1984 | (JP) . |
| 4-301945 | 10/1992 | (JP) . |
| 5-63831 | 3/1993 | (JP) . |
| 7-500467 | 1/1995 | (JP) . |
| 8-79168 | 3/1996 | (JP) . |
| 8-102737 | 4/1996 | (JP) . |
| 61-131653 | 6/1996 | (JP) . |
| 9-83576 | 3/1997 | (JP) . |
| 9-162803 | 6/1997 | (JP) . |
| 9-200120 | 7/1997 | (JP) . |

OTHER PUBLICATIONS

"Personal Digital Cellular Telecommunications System", the Standards of the ARIB (Association of Radio Industries and Businesses), RCR STD–27F, vol. 3, appendix 3–18 (4/91) (first standardization) to 2/97, (revision).

* cited by examiner

Primary Examiner—Lester G. Kincaid
(74) Attorney, Agent, or Firm—Foley & Lardner

(57) ABSTRACT

A multi-connector for the mobile data communication is provided, by which multi-connection of data terminals is possible and real-time communication is also possible even when data are concentrated in a single line or even with a line of an inferior quality. The multi-connector is connected with a mobile communication exchange in the system and is activated according to a multi-connection request sent from a mobile or fixed station to the mobile communication exchange, and the multi-connector controls data communication based on a predetermined transmission control proceeding and distributes data in accordance with designation with respect to an addressee for each item of data.

13 Claims, 3 Drawing Sheets

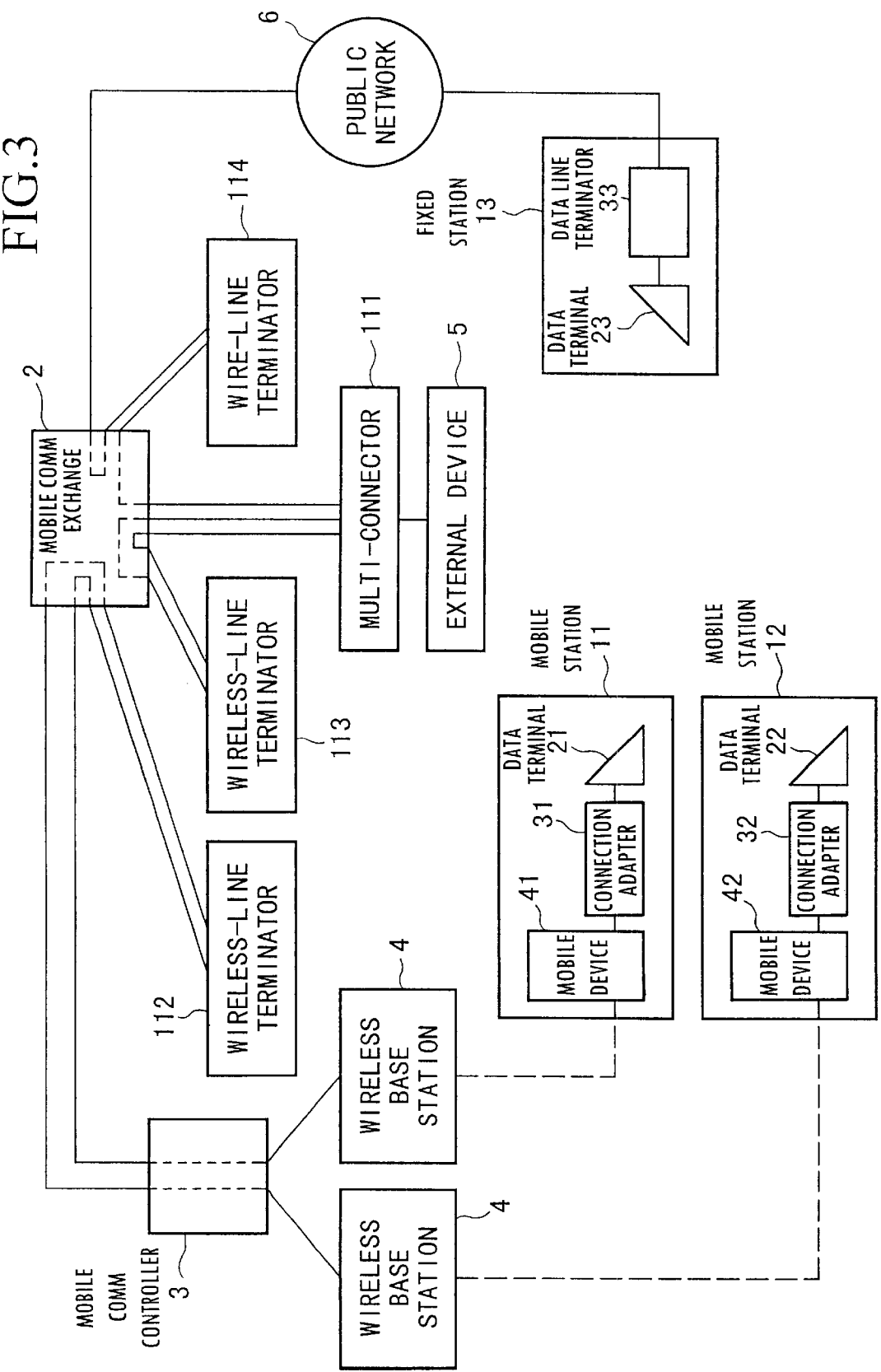

MOBILE COMMUNICATION SYSTEM DATA MULTI-CONNECTOR

BACKGROUND OF THE INVENTION

1. Field of the Invention

The present invention relates to a mobile data-communication system.

This application is based on patent application No. Hei 9-335556 filed in Japan, the contents of which are incorporated herein by reference.

2. Description of the Related Art

Conventional mobile data-communication systems are based on a one-to-one system. An example of the conventional system is disclosed in "PERSONAL DIGITAL CELLULAR TELECOMMUNICATION SYSTEM", the Standards of the ARIB (Association of Radio Industries and Businesses), RCR STD-27F, the third volume, appendix 3–18, April, 1991 (first standardization) to February, 1997 (revision).

The following are problems generated by the above conventional mobile data-communication system:

The first problem is that data communication in connection with multiple lines is impossible. The reason is that only one-to-one data communication is regulated in the system.

The second problem is that when line quality is inferior, real-time data transmission is impossible. The reason is that even with lines having inferior qualities, all data are always transmitted in the regulated system.

SUMMARY OF THE INVENTION

In consideration of the above circumstances, an objective of the present invention is to provide a multi-connector used for the mobile data-communication system, which enables multi-connection of data terminals.

Another objective of the present invention is to provide a multi-connector for a mobile data-communication system, a mobile data-communication system itself, and a multi-connecting method by which even when data are concentrated in a single line or even with a wireless line of inferior quality, real-time data communication is possible.

Therefore, the present invention provides a multi-connector for a mobile data-communication system, which is connected with a mobile communication exchange in the system, wherein the multi-connector is activated according to a multi-connection request which is sent from a mobile or fixed station to the mobile communication exchange, and the multi-connector controls data communication based on a predetermined transmission control proceeding and distributes data in accordance with the designation with respect to an addressee for each item of data.

Typically, the multi-connector comprises:

a wireless-line terminator for establishing an error-control protocol with respect to a connection adapter which is provided in the mobile station so as to connect a mobile device with a data terminal and which controls data communication via a mobile network, and the wireless-line terminator for correcting erroneous data and performing compressing and expanding operations;

a wire-line terminator for establishing an error-control protocol with respect to a data line terminator which is provided in the fixed station and which controls data communication via a public network, and the wireless-line terminator for performing compressing and expanding operations; and an integrating section for collecting data received from the wireless-line terminator and the wire-line terminator, and sending each item of data to the designated addressee.

Accordingly, each addressee can be designated using an application program used in a data terminal or using the connection adapter, and the multi-connector can identify the designated addressee, and then relevant data is sent. If plural addressees are designated, the relevant data can be sent to each addressee by duplicating the data. Therefore, data terminals which are presently connected in the system are managed and each item of data is sent according to designation of an addressee; thus, multi-connection can be realized even in the mobile data communication.

When an amount of stored data to be sent from the wireless-line terminator to the connection adapter, or an amount of stored data to be sent from the wire-line terminator to the data line terminator is large, the relevant data may be thinned out as much as possible and then sent.

The multi-connector may further comprise an external-device interface for connecting an external device so that the external device sends and receives data to and from the integrating section.

When an amount of stored data to be sent from the external-device interface to the external device, the relevant data may be thinned out as much as possible and then sent.

The above thinning of data is generally performed based on the consideration that data which were sent via multiple lines may be concentrated in a single line. In particular, in a wireless-communication area, even if no data concentration is generated, line quality is inferior and communication speed may be lowered. At the time of sending data, the wireless-line terminator thins out data as much as possible, according to the mount of stored data, thereby realizing real-time communication even in an undesirable transmission situation. The data which can be thinned out may be designated by the sending side, and each item of data may have a priority level. For example, if data belonging to a single line is omitted in facsimile transmission, or if a frame in moving pictures is lost, no problem occurs in practice. In addition, if the data of moving pictures are concentrated in a single line, data of lower priority can be thinned out such that, for example, only voice data are transmitted without transmitting picture data.

The wireless-line terminator and the wire-line terminator may be provided outside the multi-connector. In this case, any number of terminators can easily be provided outside the multi-connector and the number of presently-provided terminators corresponds to the number of possible terminals to be connected. Therefore, it is easy to change the maximum number of terminals which can be connected with the multi-connector.

The present invention also provides a mobile data-communication system comprising:

a plurality of mobile stations, each comprising:
a mobile device for performing control with respect to a wireless line for mobile communication;
a data terminal for performing data communication via a mobile network; and
a connection adapter for connecting the mobile device and the data terminal, and for controlling data communication via the mobile network;

a fixed station comprising:
a data terminal for performing data communication via a public network; and
a data line terminator for controlling data communication via the public network;

a plurality of wireless base stations for controlling wireless lines for mobile communication;

a mobile communication controller for controlling the wireless base stations;

a mobile communication exchange, which covers the mobile stations via the mobile communication controller and the wireless base stations, for performing operations of exchanging and connecting mobile communication calls with respect to the mobile stations, and the mobile communication exchange, which also covers the fixed station, for performing operations of exchanging and connecting communication calls with respect to the fixed station; and a multi-connector, connected with the mobile communication exchange and activated according to a multi-connection request which is sent from a mobile or fixed station to the mobile communication exchange, for controlling data communication based on a predetermined transmission control proceeding and distributing data in accordance with designation with respect to an addressee for each item of data.

Typically, the multi-connector comprises the above-mentioned wireless-line terminator, wire-line terminator, and integrating section.

The present invention further provides a mobile data-communication method to be used in the above mobile data-communication system, wherein:

the mobile communication exchange activates the wireless-line terminator or the wire-line terminator according to a multi-connection request which is sent from the mobile or fixed station and connects the multi-connector with the mobile or fixed station;

when the multi-connector is activated by the mobile communication exchange, the multi-connector controls data communication with respect to the connection adapter or the data line terminator, based on a predetermined transmission control proceeding, and informs the integrating section of information on an address of the mobile or fixed station as an addressee; and the integrating section informs the mobile or fixed station of information on presently-connected terminals.

BRIEF DESCRIPTION OF THE DRAWINGS

FIG. 3 is a block diagram showing the construction of a mobile data-communication system as the second embodiment according to the present invention.

DESCRIPTION OF THE PREFERRED EMBODIMENTS

Hereinbelow, embodiments according to the present invention will be explained with reference to the drawings.

Figure 1:
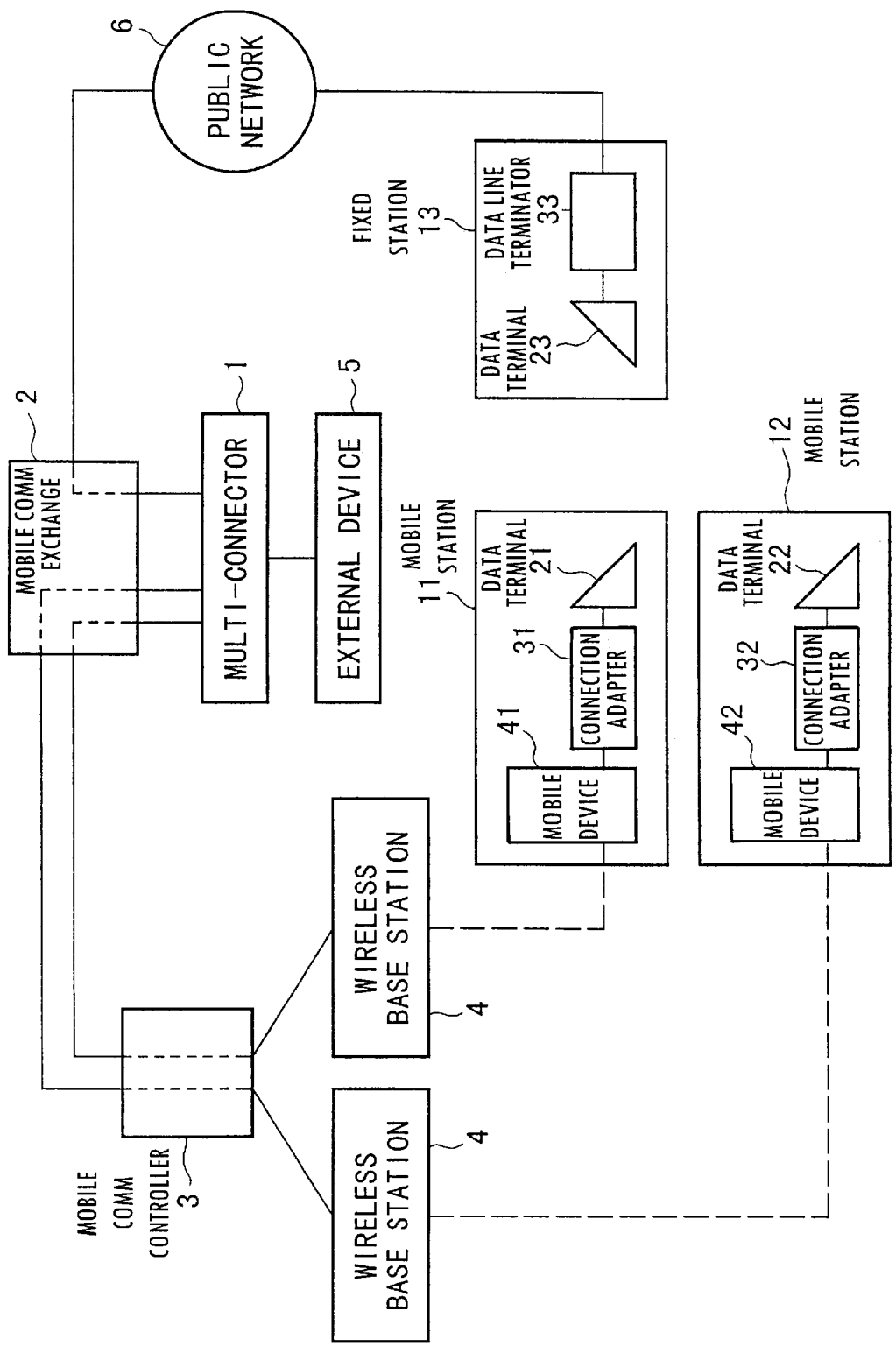
FIG. 1 is a block diagram showing the construction of a mobile data-communication system as the first embodiment according to the present invention.

FIG. 1 is a block diagram showing the construction of a mobile data-communication system as the first embodiment. With reference to FIG. 1, mobile station 11 comprises mobile device 41 for performing control with respect to a wireless line for mobile communication, data terminal 21 for communicating with data terminal 22 in another mobile station 12 via a mobile communication network, and connection adapter 31, inserted between mobile device 41 and data terminal 21, for connecting the device 41 and terminal 21 with each other and for controlling data communication via the mobile communication network. Similarly, mobile station 12 comprises mobile device 42 for performing control with respect to a wireless line for mobile communication, data terminal 22 for communicating with data terminal 21 in the mobile station 11 via the mobile communication network, and connection adapter 32, inserted between mobile device 42 and data terminal 22, for connecting the device 42 and terminal 22 with each other and for controlling data communication via the mobile communication network.

On the other hand, fixed station 13 comprises data terminal 23 for performing two-way data communication via a (general) public network 6 and data line terminator 33 for controlling data communication via the public network 6.

Mobile communication controller 3 controls plural wireless base stations 4 for controlling wireless lines for mobile communication. Mobile communication exchange 2 covers mobile stations 11 and 12 via mobile communication controller 3 and wireless base stations 4, and performs operations of exchanging and connecting mobile communication calls with respect to the mobile stations 11 and 12. The mobile station also covers fixed station 13 and performs operations of exchanging and connecting communication calls with respect to the fixed station 13.

At least one multi-connector 1 is connected to mobile communication exchange 2, and any suitable device in the system is activated according to a multi-connection request sent from mobile station 11 or 12, or fixed station 13 to the mobile communication exchange 2. The activated device performs control operations necessary for data communication based on a predetermined control processing for data transmission. The activated device also has a function of distributing data according to designation with respect to an addressee or destination. In addition, the multi-connector 1 has an interface for connecting external device 5.

Figure 2:
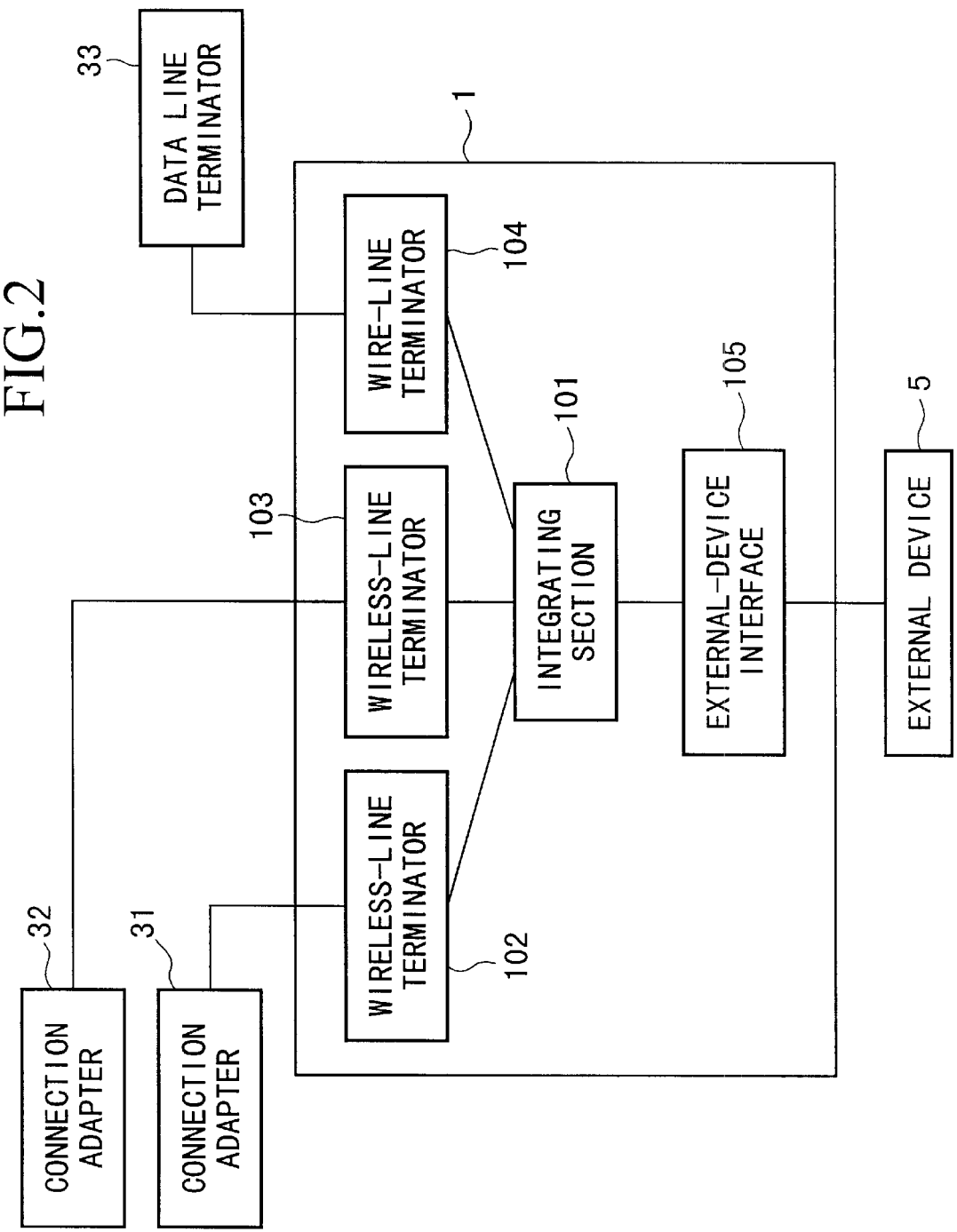
FIG. 2 is a block diagram showing the construction of multi-connector 1 in FIG. 1.

FIG. 2 is a block diagram indicating an exemplary construction of the multi-connector 1. In FIG. 2, parts which are identical to those shown in FIG. 1 are given identical reference numbers.

The multi-connector 1 comprises wirelessline terminators 102 and 103, wire-line terminator 104 connected with public network 6, external-device interface 105 connected with external device 5, and integrating section 101 for collecting data received via wireless-line terminators 102 and 103, line terminator 104, and external-device interface 105, and sending each item of data to a designated addressee.

The wireless-line terminators 102 and 103 establish a specified error-control protocol with respect to connection adapters 31 and 32 so as to correct erroneous data, and perform operations of compressing and expanding data. Data received by the wireless-line terminators 102 and 103 from the connection adapters 31 and 32 are further sent to integrating section 101. On the other hand, regarding data received by the wireless-line terminators 102 and 103 from the integrating section 101, if the amount of stored data to be sent to connection adapters 31 and 32 is large, data are thinned out as much as possible, and then sent.

Similarly, wire-line terminator 104 establishes a specified error-control protocol with respect to data line terminator 33, and performs predetermined operations of compressing and expanding data. Data received by the wire-line terminator 104 from the data line terminator 33 is further sent to integrating section 101. On the other hand, regarding data received by the wire-line terminator 104 from the integrating section 101, if the amount of stored data to be sent to the data line terminator 33 is large, data are thinned out as much as possible, and then sent.

The external-device interface 105 receives data from external device 5, and sends it to integrating section 101. Regarding data received by the external-device interface 105 from the integrating section 101, if the amount of stored data to be sent to the external device 5 is large, data are thinned out as much as possible, and then sent.

The integrating section 101 receives and processes data sent from wireless-line terminators 102 and 103, wire-line terminator 104, and external-device interface 105 in turn, and sends each unit of data to a designated addressee. Regarding data having plural designated addressees, the data is sent to the plural addressees.

Operations of the present embodiment will be explained with reference to FIGS. 1 and 2.

In order to realize multi-connection, the mobile station 11 accesses the mobile network in accordance with a predetermined processing. For example, an exclusive telephone number is provided and an operation of calling from the mobile station 11 by using this telephone number is performed.

When the mobile communication exchange 2 receives a predetermined multi-connection request from mobile station 11, the exchange 2 activates wireless-line terminator 102 among plural line terminators in the multi-connector 1, which are provided for terminating each relevant terminal, so as to connect multi-connector 1 with mobile station 11. The multi-connector 1, which was activated by the mobile communication exchange 2, controls data communication with the connection adapter 31 based on a predetermined transmission control proceeding, and informs integrating section 101 of information such as the address of mobile station 11. For example, if external device 5 is always connected with external device interface 105, then integrating section 101 informs mobile station 11 and external device 5 of information on terminals presently connected, thereby enabling external device 5 and data terminal 21 to communicate with each other.

Similarly, in order to perform multi-connection, mobile station 12 accesses the mobile network based on a predetermined proceeding.

When the mobile communication exchange 2 receives a multi-connection request from mobile station 12, the exchange 2 activates wireless-line terminator 103 among plural line terminators in multi-connector 1, which are provided for terminating each relevant terminal, so as to connect multi-connector 1 with mobile station 12. The multi-connector 1, which was activated by the mobile communication exchange 2, controls data communication with the connection adapter 32 based on a predetermined transmission control proceeding, and informs integrating section 101 of information such as the address of mobile station 12. The integrating section 101 informs mobile stations 11 and 12 of information on terminals presently connected, thereby enabling data terminals 21 and 22 to communicate with each other.

Similarly, in order to perform multi-connection, fixed station 13 accesses the mobile network based on a predetermined proceeding.

When the mobile communication exchange 2 receives a multi-connection request from fixed station 13, the exchange 2 activates wire-line terminator 104 among plural line terminators in multi-connector 1, which are provided for terminating each relevant terminal, so as to connect multi-connector 1 with fixed station 13. The multi-connector 1, which was activated by the mobile communication exchange 2, controls data communication with the data line terminator 33 based on a predetermined transmission control proceeding, and informs integrating section 101 of information such as the address of fixed station 13. The integrating section 101 informs mobile stations 11 and 12 and fixed station 13 of information on terminals presently connected, thereby enabling data terminals 21, 22, and 23 to communicate with each other.

In the present embodiment, two wireless-line terminators, a wire-line terminator, and an external-device interface are used. However, no limitation is imposed on the number of each of these devices.

Another embodiment according to the present invention will be explained with reference to FIG. 3. In this figure, parts which are identical to those shown in FIGS. 1 and 2 are given identical reference numbers.

In this embodiment as shown in FIG. 3, wireless line terminators 102 and 103, wire-line terminator 104, and external-device interface 105, which are provided in multi-connector 1 in the former embodiment as shown in FIG. 2, are provided outside the multi-connector 1.

Operations of the present embodiment will be explained with reference to FIG. 3.

In order to realize multi-connection, the mobile station 11 accesses the mobile network in accordance with a predetermined processing. When the mobile communication exchange 2 receives a predetermined multi-connection request from mobile station 11, the exchange 2 activates wireless-line terminator 112 among plural line terminators, which are provided for terminating each relevant terminal, and also activates multi-connector 111, so as to connect the multi-connector 111 with mobile station 11 via wireless-line terminator 112.

The wireless-line terminator 112, which was activated by the mobile communication exchange 2, controls data communication with the connection adapter 31 based on a predetermined transmission control proceeding, and informs multi-connector 111 of information such as the address of mobile station 11. For example, if external device 5 is always connected with external-device interface 105, then integrating section 101 informs mobile station 11 and external device 5 of information on terminals presently connected, thereby enabling external device 5 and data terminal 21 to communicate with each other.

According to similar operations, mobile station 12 and fixed station 13 are connected with each other, thereby enabling data terminals 21, 22, and 23 to communicate with each other.

According to the present embodiment, it is easy to change the maximum number of terminals which can be connected with the multi-connector. The reason for this is as follows. If wireless-line terminators and wire-line terminators are provided in the multi-connector, then the fixed number of the terminators established in the multi-connector corresponds to the number of possible terminals to be connected. However, if wireless-line terminators and wire-line terminators are provided outside the multi-connector, then any number of terminators can easily be provided outside the multi-connector and the number of presently-provided terminators corresponds to the number of possible terminals to be connected.

In the present embodiment, two wireless-line terminators, a wire-line terminator, and an external-device interface are used. However, no limitation is imposed on the number of each of these devices.

What is claimed is:

1. A multi-connector for a mobile data-communication system, which is connected with a mobile communication exchange in the system, wherein:

the multi-connector is activated according to a multi-connection request which is sent from a mobile or fixed station to the mobile communication exchange, and the multi-connector controls data communication based on a predetermined transmission control proceeding and distributes data in accordance with designation with respect to an addressee for each item of data, the multi-connector comprising:

a wireless-line terminator for establishing an error-control protocol with respect to a connection adapter which is provided in the mobile station so as to connect a mobile device with a data terminal and which controls data communication via a mobile network, and the wireless-line terminator for connecting erroneous data and performing compressing and exchanging operations;

a wire-line terminator for establishing an error-control protocol with respect to a data line terminator which is provided in the fixed station and which controls data communication via a public network, and the wire-line terminator for performing compressing and exchanging operations; and an integrating section for collecting data received from the wireless-line terminator and the wire-line terminator, and sending each item of the data to the designated addressee.

2. A multi-connector as claimed in claim 1, further comprising:

an external-device interface for connecting an external device so that the external device sends and receives data to and from the integrating section.

3. A multi-connector as claimed in claim 2, wherein when an amount of stored data to be sent from the external-device interface to the external device is greater than a predetermined threshold, the relevant data are thinned out as much as possible and then sent.

4. A multi-connector as claimed in claim 2, wherein the wireless-line terminator and the wire-line terminator are provided outside the multi-connector.

5. A multi-connector as claimed in claim 1, wherein when a amount of stored data to be sent from the wireless-line terminator to the connection adapter, or an amount of stored data to be sent from the wire-line terminator to the data line terminator is greater than a predetermined threshold, the relevant data are thinned out as much as possible and then sent.

6. A mobile data-communication system comprising:

a plurality of mobile stations, each comprising:

a mobile device for performing control with respect to a wireless line for mobile communication;

a data terminal for performing data communication via a mobile network; and a connection adapter for connecting the mobile device and the data terminal, and for controlling data communication via the mobile network;

a fixed station comprising:

a data terminal for performing data communication via a public network; and a data line terminator for controlling data communication via the public network;

a plurality of wireless base stations for controlling wireless lines for mobile communication;

a mobile communication controller for controlling the wireless base stations;

a mobile communication exchange, which covers the mobile stations via the mobile communication controller and the wireless base stations, for performing operations of exchanging and connecting mobile communication calls with respect to the mobile stations, and the mobile communication exchange, which also covers the fixed station, for performing operations of exchanging and connecting communication calls with respect to the fixed station; and a multi-connector, connected with the mobile communication exchange and activated according to a multi-connection request which is sent from a mobile or fixed station to the mobile communication exchange, for controlling data communication based on a predetermined transmission control proceeding and distributing data in accordance with designation with respect to an addressee for each item of data, wherein the multi-connector comprises:

a wireless-line terminator for establishing an error-control protocol with respect to the connection adapter which is provided in the mobile station so as to connect the mobile device with the data terminal and which controls data communication via the mobile network, and the wireless-line terminator for connecting erroneous data and performing compressing and exchanging operations;

a wire-line terminator for establishing an error-control protocol with respect to the data line terminator which is provided in the fixed station and which controls data communication via the public network, and the wire-line terminator for performing compressing and exchanging operations; and an integrating section for collecting data received from the wireless-line terminator and the wire-line terminator, and sending each item of the data to the designated addressee.

7. A mobile data-communication system as claimed in claim 6, wherein an external device is connected with the multi-connector, and wherein the multi-connector provides connections of the external device with a plurality of different devices.

8. A mobile data communication system as claimed in claim 7, wherein the external device is an only terminating device directly coupled to the multi-connector.

9. A mobile data communication system as claimed in claim 7, wherein, when the multi-connection request is sent from the mobile station, only the wireless-line terminator is activated so as to provide a first communications path between the mobile station and the external device, and wherein, when the multi-connection request is sent from the fixed station, only the wire-line terminator is activated so as to provide a second communications path between the fixed station and the external device.

10. A mobile data-communication system as claimed in claim 6, wherein only one of the wireless-line interface and the wire-line interface is activated based on the multi-connection request.

11. A mobile data communication system as claimed in claim 6, wherein the integrating section is provided on a first communications path between the external device and the wireless-line terminator and wherein the integrating section is also provided on a second communications path between the external device and the wire-line terminator.

12. A mobile data communication system as claimed in claim 6, wherein the integrating section provides the collected data from one of the wire-line terminator and the wireless-line terminator that is currently activated to the external device, and wherein the integrating section sends each item of data provided by the external device to the one of the wire-line terminator and the wireless-line terminator that is currently activated.

13. A multi-connecting method to be used in a mobile data-communication system, the mobile data-communication system comprising:

a plurality of mobile stations, each comprising:
  a mobile device for performing control with respect to a wireless line for mobile communication;
  a data terminal for performing data communication via a mobile network; and
  a connection adapter for connecting the mobile device and the data terminal, and for controlling data communication via the mobile network;

a fixed station comprising:
  a data terminal for performing data communication via a public network; and
  a data line terminator for controlling data communication via the public network;

a plurality of wireless base stations for controlling wireless lines for mobile communication;

a mobile communication controller for controlling the wireless base stations;

a mobile communication exchange, which covers the mobile stations via the mobile communication controller and the wireless base stations, for performing operations of exchanging and connecting mobile communication calls with respect to the mobile stations, and the mobile communication exchange, which also covers the fixed station, for performing operations of exchanging and connecting communication calls with respect to the fixed station; and a multi-connector, connected with the mobile communication exchange and activated according to a multi-connection request which is sent from a mobile or fixed station to the mobile communication exchange, for controlling data communication based on a predetermined transmission control proceeding and distributing data in accordance with designation with respect to an addressee for each item of data, wherein the multi-connector comprises:
  a wireless-line terminator for establishing an error-control protocol with respect to the connection adapter which is provided in the mobile station so as to connect the mobile device with the data terminal and which controls data communication via the mobile network, and the wireless-line terminator for connecting erroneous data and performing compressing and exchanging operations;
  a wire-line terminator for establishing an error-control protocol with respect to the data line terminator which is provided in the fixed station and which controls data communication via the public network, and the wire-line terminator for performing compressing and exchanging operations; and
  an integrating section for collecting data received from the wireless-line terminator and the wire-line terminator, and sending each item of the data to the designated addressee, the method comprising:
  activating, by the mobile communication exchange, the wireless-line terminator or the wire-line terminator according to a multi-connection request which is sent from the mobile or fixed station;
  connecting the multi-connector with the mobile or fixed station according to the multi-connection request;
  controlling, by the multi-connector, data communications with respect to the connection adapter or the data line terminator, based on a predetermined transmission control proceeding;
  informing the integrating section of information on an address of the mobile or fixed station as an addressee; and
  informing, by the integrating section, the mobile or fixed station of information on presently-connected terminals.

* * * * *